United States Patent [19]

Donermeyer et al.

[11] 4,222,976

[45] Sep. 16, 1980

[54] CAVITY FILLING WITH A HOT MELT ADHESIVE COMPOSITION

[75] Inventors: Donald D. Donermeyer, Springfield; Joseph G. Martins, Ludlow, both of Mass.

[73] Assignee: Monsanto Company, St. Louis, Mo.

[21] Appl. No.: 948,121

[22] Filed: Oct. 2, 1978

[51] Int. Cl.$^2$ ............................................. B32B 35/00
[52] U.S. Cl. ...................................... 264/36; 264/162; 427/142
[58] Field of Search ...................... 260/40 R; 427/142; 264/36, 162

[56] References Cited

U.S. PATENT DOCUMENTS

| | | | |
|---|---|---|---|
| 3,650,999 | 3/1972 | Martins et al. | 260/22 D |
| 3,859,251 | 1/1975 | Kuhfuss et al. | 260/47 CZ |
| 3,959,062 | 5/1976 | Hoh | 156/313 |
| 4,073,973 | 2/1978 | Martins et al. | 427/142 |
| 4,125,571 | 11/1978 | Scott et al. | 260/860 |

FOREIGN PATENT DOCUMENTS 1317621  6/1973  United Kingdom .

OTHER PUBLICATIONS

Q-Cel Microspheres Product Bulletin QC-10, PQ Corporation.

*Primary Examiner*—James H. Derrington
*Attorney, Agent, or Firm*—R. Bruce Blance; William J. Farrington; Edward P. Grattan

[57] ABSTRACT

A method of filling a cavity in a substrate which comprises applying excess adhesive composition as a hot melt into the cavity, spreading the adhesive composition to fill the cavity, cooling the adhesive composition and sanding the composition to provide a surface even with the surrounding substrate. The adhesive composition comprises a block copolymer, aluminum powder and glass fiber. The block copolymer is selected from the group consisting of copolyesters, copolyamides, copoly(esteramides) and copoly(ether-esters) melting at a temperature above about 150° C. and having from about 30 to about 70 weight percent of hard segments and from about 70 to about 30 weight percent of soft segments. The weight ratio of block copolymer to aluminum powder and glass fiber is in the range of about 3:7 to about 3:2, the weight ratio of block copolymer to glass fiber is at least about 2:1, and the weight ratio of glass fiber to aluminum powder is at least about 1:9.

18 Claims, No Drawings

CAVITY FILLING WITH A HOT MELT ADHESIVE COMPOSITION

The present invention relates to a hot melt adhesive composition, to method of filling voids with the adhesive composition and to articles filled or coated with the hot melt adhesive composition. More particularly, it refers to block copolymers containing glass fibers and a finely divided metal powder, to a method of filling voids with such compositions and to articles, filled or coated with the compositions.

Hot melt adhesives are well known in the prior art. These materials are conveniently applied to a substrate in the molten state and upon cooling form an adhesive bond. However, a deficiency common to most of the hot melt adhesives of the prior art is their tendency to soften and flow at elevated temperature, as, for example, 70° to 100° C. with a resulting loss of bond strength. Consequently, these materials are not suitable for use over a broad temperature range.

Attempts to upgrade the softening and flow temperatures have involved using very high molecular weight resinous materials and/or crosslinking of the resin. These methods have resulted in materials with higher softening points and flow temperatures. However, in most cases the resulting material was not adapted to thermal processing because its higher molecular weight and/or crosslinked structure engendered extremely high application viscosity. Thus, these materials were not suitable for use as hot melt adhesives.

In the manufacture and repair of metal bodies such as automobiles and appliances, solder compositions containing lead are frequently used to fill cavities and voids. These lead solders are extremely dense and can add a significant increment to the weight of the metal body. They present a health hazard which mandates special handling to protect workers engaged in the soldering and cavity filling operations. Curable adhesives such as epoxies are generally unsatisfactory for such cavity and void filling applications because they require careful metering of the components to provide good physical properties and bond strength, because they take too long to cure a sandable state and because they have rather poor weather resistance. Conventional hot melt adhesives are also unsatisfactory for cavity and void filling applications because they cannot be sanded rapidly at assembly line speed, they do not readily accept paint, exhibiting "bleed-through", and they do not withstand the high temperatures necessary for the subsequent cure of paint overcoats. "Bleed-through" or "telegraphing" is the term used to describe the revelation of difference in composition of the substrate when it has been painted, caused by a difference in reflectivity between the painted metal and the painted adhesive composition.

U.S. Pat. No. 3,650,999 discloses block copolymer comprising hard polyester segments and soft polyamide segments having improved adhesion and high temperature performance obtained by reacting a crystalline polyester, a $C_{18}$ to $C_{54}$ polycarboxylic acid and a primary diamine. This poly(ester-amide) in common with other hot melt adhesives has deficiencies in creep resistance at temperatures above 150° C. in the range up to 205° C. and above and in shrinkage when the hot melt is cooled to room temperature after application. These deficiencies have been overcome to a considerable degree by incorporating a metal powder into the block copolymer to yield a cavity filling composition which possesses good sandability and paint acceptance. However, the metal powder copolymer composition can lack adequate impact resistance especially at low temperatures and can sag excessively at elevated temperatures. Attempts to improve the impact resistance by introducing an energy-absorbing rubber reinforcement were generally unsuccessful and added a further complication of binding of the sanding disc, making sanding extremely difficult.

The present invention is directed to an adhesive composition of improved impact resistance at low temperatures, which is less dense and toxic than lead solder, forms a strong bond to metal and painted metal substrates, withstands extremes of humidity and temperature, has sag resistance at elevated temperatures, is readily trowelled to fill a cavity, sets rapidly to a sandable state, is easily sanded smooth and accepts paint without "bleed-through".

The adhesive composition comprises a block copolymer, aluminum powder, and glass fiber; wherein the block copolymer is selected from the group consisting of copolyesters, copolyamides, copoly(esteramides) and copoly(ether-esters) melting at a temperature of at least about 150° C., having from about 30 to about 70 weight percent of hard segments and from about 70 to about 30 weight percent of soft segments, wherein the weight ratio of block copolymer to aluminum powder and glass fiber is in the range of about 3:7 to about 3:2, wherein the weight ratio of block copolymer to glass fiber is at least about 2:1 and wherein the weight ratio of glass fiber to aluminum powder is at least about 1:9.

Another aspect of the invention is directed to substrates coated or filled with the adhesive composition and yet another aspect is directed to a method of filling a cavity in a substrate which comprises applying the adhesive composition as a hot melt to fill the cavity, cooling the adhesive composition below the crystallization temperature of the block copolymer and sanding the adhesive composition to provide a surface even with the surrounding substrate.

The block copolymer of the adhesive compositions of the present invention is selected from the group consisting of copolyesters, copolyamides, copoly(ester-amides) and copoly(ether-esters) melting at a temperature of at least about 150° C., having hard segments and soft segments to provide a balance of physical properties and processability. These are considered to exist in microscopic domains within the bulk mass of copolymer resin to provide a heterophase system in which the copolymer will have physical properties reflecting the properties which the respective segments would manifest independently. By control of the relative size, proportions, crystallinity and crystal melting points of the segments, the tack, open time and bond strength of the adhesive can be controlled. The hard segments contribute crystalline blocks to the copolymer so that optimum bulk physical properties such as tensile strength and stiffness can be achieved without incurring the disadvantage of high processing viscosity.

The hard or crystalline segments can be polyester or polyamide of weight average molecular weight of from about 400 to about 16,000 to ensure that the segment will contribute the optimum ordered structure to the final polymeric product. Polyesters and polyamides with a weight average molecular weight of less than about 400 have a short chain length and cannot contribute the necessary ordered structure to the final polymeric product which also comprises soft segments. Polyesters and polyamides with a weight average molecular weight of greater than about 16,000 may require excessive reaction times or temperatures to form the final block copolymer leading to degradation of the polymer and a subsequent loss in adhesive properties. To ensure that the final polymeric product has excellent thermal properties such as resistance to flow at elevated temperatures the melting point of the hard polyester or polyamide segment should be at least about 180° C. Preferably, the melting point is in the range of from 200° C. to 270° C.

The hard or crystalline polyester segments of the block copolymer are condensed from at least one aliphatic or alicyclic diol having from 2 to 10 carbon atoms and at least one alicyclic or aromatic dicarboxylic acid having from 8 to 20 carbon atoms selected to give a melting point in the desired range.

Representative examples of such acids are terephthalic acid, isophthalic acid, hexahydroterephthalic acid, the naphthalic acids, such as 2,6-, 2,7-, 2,8-, 1,5- and 1,4-naphthalene dicarboxylic acids and other such acids which form high melting polyester resins. Examples of glycols are ethylene glycol, propylene glycol, tetramethylene glycol, neopentylene glycol, 1,4-cyclohexane diol, 1,4-cyclohexane dimethanol and other such glycols. High melting polymers containing components such as 2,2-dimethylpropane diol, form polyesters which have melting points above 234° C. Mixtures of the foregoing polyesters can also be used.

Preferably, a polyester from the following group can be used to provide the hard segments of the block copolymer:

Poly(ethylene terephthalate/isophthalate), 100/0 to 75/25;
Poly(ethylene/hexamethylene terephthalate), 100/0 to 75/25;
Poly(ethylene/neopentylene terephthalate), 100/0 to 75/25;
Poly(tetramethylene terephthalate/isophthalate), 100/0 to 75/25;
Poly(tetramethylene/hexamethylene terephthalate), 100/0 to 75/25;
Poly(tetramethylene/neopentylene terephthalate), 100/0 to 75/25;
Poly(ethylene/propylene terephthalate), 100/0 to 60/40; and
Poly(tetramethylene 2,6-naphthalate/terephthalate), 100/0 to 75/25; etc.

When the hard polyester segments comprise polyethylene terephthalate, the molecular weight range corresponds to an inherent viscosity range of about 0.05 to about 0.7 determined at 25° C. with a solution of 0.5 g/100 ml in a solvent pair consisting of phenol and sym-tetrachloroethane in the weight ratio of 60:40.

The hard or crystalline polyamide segments of the block copolymer can be condensed from at least one aliphatic or alicyclic diamine having from 2 to 12 carbon atoms and at least one aliphatic or alicyclic dicarboxylic acid having from 2 to 12 carbon atoms selected to provide a polyamide with a melting point in the desired range. Examples of diamines include ethylene diamine, 1,3-propane diamine, 1,4-butane-diamine, 1,5-pentane diamine, hexamethylene diamine, 1,10-decanediamine, cyclohexanediamine, etc. Examples of acids include oxalic, malonic, succinic, glutaric, adipic, pimelic, suberic, azelaic, and sebacic acids. The hard or crystalline polyamide segments of the block copolymer can be obtained by polymerization of ω-aminocarboxylic acids containing from 2 to 10 carbon atoms such as aminoacetic acid, 3-aminopropionic acid, 4-aminobutyric acid, 6-aminohexoic acid, 10-aminodecanoic acid, etc. Polymerization of lactams such as ε-caprolactam provides a route to several of such polyamides. Among the preferred polyamides are poly(hexamethylene adipamide) and poly(ε-caprolactam).

The soft, amorphous or low melting segments of the block copolymer contribute wettability, elasticity and rubber character to the copolymer. They can be polyester, poly(ether-ester) or polyamide and are generally of weight average molecular weight in the range of about 300 to about 16,000 and possess a glass transition temperature less than about 50° C. and more preferably in the range of about −30° to about 40° C.

The soft polyester segments of the block copolymer can be condensed from an aliphatic or alicyclic diol having from 4 to 10 carbon atoms and an aliphatic, alicyclic or aromatic dicarboxylic acid having from 4 to 54 carbon atoms selected to provide a polyester with a glass transition temperature in the desired range. They can be formed by reacting a polylactone diol of number average molecular weight in the range of about 350 to 6000 with an aliphatic, alicyclic or aromatic dicarboxylic acid having from 4 to 54 carbon atoms. Poly(ether-ester) segments can be prepared by condensing a poly(alkylene ether) glycol of number average molecular weight in the range of about 350 to 6000 in which the alkylene groups have from 2 to 10 carbon atoms with an aliphatic, alicyclic or aromatic dicarboxylic acid having from 4 to 54 carbon atoms. Polyamide segments can be prepared by condensing an aliphatic or alicyclic diamine having from 2 to 12 carbon atoms with a mixture of an aliphatic or alicyclic dicarboxylic acid having from 4 to 54 carbon atoms and at least 40 weight percent of an aliphatic dicarboxylic acid having from 18 to 54 carbon atoms.

The block copolymers are prepared by a one step or two step method. In the one step method the components which form the hard or soft segments are polymerized in the presence of a prepolymer of the soft or hard segments respectively. In the two step method the hard segments and soft segments are prepared separately as prepolymers and then condensed together.

The preferred block copolymer component of the present invention contains about 30 to about 70 percent by weight of hard segments and conversely about 70 to about 30 percent by weight of soft segments. It is further characterized as having a weight average molecular weight in the range of about 5500 to about 30,000, more preferably in the range of about 8000 to about 20,000 for an optimal balance of physical properties and processability. The melting point of the copolymer component is above about 150° C. and is preferably in the temperature range of about 155° to about 225° C. for ease of processing without degradation of the copolymer. The glass transition temperature associated with the soft segments of the copolymer is generally less than about 50° C. and is preferably in the range of about −30° to 40° C. to contribute wettability, elasticity, and rubber character to the copolymer. The melting point and glass transition temperature are conveniently determined with a duPont differential thermal analyzer Model DTA 900 with the scanning calorimeter attachment, employing a 5 to 25 mg sample heated at a rate of 20° C. per minute, in a nitrogen atmosphere. The melt viscosity of the copolymer at 232° C. is preferably less than 150,000 centipoise at a shear rate of 4 sec$^{-1}$ and is preferably in the range of about 25,000 to 100,000 centipoise.

The most preferred group of block copolymers are block copoly(ester-amides) of the type described in U.S. Pat. No. 3,650,999. They comprise hard segments of polyester as described hereinabove, and soft segments of polyamide formed by condensing a $C_{18}$ to $C_{54}$ dicarboxylic acid and a $C_2$ to $C_{10}$ aliphatic or alicyclic primary diamine. The dicarboxylic acids include the "dimer acids" from dimerization of unsaturated aliphatic monocarboxylic acids, e.g., linoleic acid, available commercially as mixtures of monobasic, dibasic and tribasic acids containing up to 10 weight percent of monobasic and tribasic acids. The aliphatic or alicyclic diamines include ethylene diamine, 1,3-diamine, 1,4-butanediamine, 1,5-pentane diamine, hexamethylene diamine, 1,10-decane-diamine, cyclohexanediamine, 2,2-dimethyl-1,3-propane diamine, etc.

Optionally up to 60 percent by weight of a linear aliphatic dibasic acid having from 4 to 17 carbon atoms may be substituted for a corresponding amount of the $C_{18}$ to $C_{54}$ polycarboxylic acid used to prepare the soft polyamide segments of the polyesteramide. Examples of these acids include oxalic, succinic, adipic, pimelic, suberic, azelaic, sebacic, dodecanedioic and thapsic acids. The advantage of substituting the $C_4$ to $C_{17}$ acids for the $C_{18}$ to $C_{54}$ acids is to provide a more heterogeneous character to the polyamide segments of the polymer and to modify the glass transition temperature.

The second component of the adhesive composition is a finely divided aluminum powder added to improve the creep resistance of the block copolymer and the sandability. It may be of average particle size in the range of about 0.2 micron to about 150 microns and is preferably of average particle size in the range of about 4 to about 50 microns. It is preferred to use an atomized aluminum of generally spheroidal shape particularly when the adhesive composition is used for cavity filling since it allows the hot melt composition to be readily smoothed and burnished when it is sanded. In general, plate-like, acicular or multi-faceted granular aluminum powders are unsatisfactory, surprisingly causing high viscosity in the hot melt and "blinding" or filling and occlusion of sand paper when the adhesive composition is sanded.

In addition to improving the creep resistance and sandability of the adhesive composition, the aluminum powder improves the rate of melting of the adhesive composition, allows the composition to be applied and spread or trowelled more easily with less pressure, imparts longer "open" time between application of the hot melt and closing of the bond and higher "green" strength of faster onset of bond strength, and reduces the degree of shrinkage of the adhesive composition when it is cooled from the hot melt temperature to ambient temperature.

When the adhesive composition comprises only the block copolymer and the aluminum powder, the impact resistance tends to be low particularly at low temperatures such as $-30°$ C. and the molten composition tends to sag at the elevated temperatures at which it is applied. Addition of glass fiber as the third component of the adhesive composition improves the impact resistance at low temperatures, reduces the tendency of the adhesive composition to sag at elevated temperatures and permits greater latitude in overcoming shrinkage and minimizing coefficient of expansion differences with the substrate. The glass fiber is of the type conventionally used for reinforcement of thermoplastic resins. It is preferred to use relatively soda-free glasses comprising lime-aluminum borosilicate glass such as types "C" and "E" glass. The glass fiber should preferably be in the form of milled fibers or chopped fibers of average length in the range of about 1/32 inch (0.8 mm) to about ¼ inch (6.4 mm) and longer, and of diameter in the range of about 2 to about 20 microns. The preferred average length is in the range of about 1/16 inch (1.6 mm) to about ¼ inch (6.4 mm).

The inorganic components of the adhesive composition may optionally be treated with an effective amount of coupling agent by methods well known to those skilled in the art before or while being blended into the block copolymer. Such coupling agents include organosilane coupling agents exemplified by triethoxy vinylsilane, vinyl methyl dichlorosilane, 2-(trimethoxysilyl)ethyl methacrylate, 3-amino-1-triethoxysilyl-propane, etc.; organotitanium coupling agents such as the alkyl alkanoyl titanates exemplified by $C_1$ to $C_{40}$ alkyl stearyl titanates; fatty acids exemplified by oleic and stearic acid; fatty amides exemplified by oleamide and stearamide and chromium compounds exemplified by methacrylato chromic chloride. These coupling agents can cause a significant reduction in the melt viscosity of the polymer filler mix, can improve the wetting and dispersion of filler, and can enhance the physical properties of the adhesive composition.

The ratio of the three components of the adhesive composition is selected so that the desired balance of adhesion, sag resistance, workability, impact resistance and sandability is achieved. Excessive amounts of glass fiber should be avoided since they contribute to very high melt viscosity, cause poor workability as manifested by the difficulty with which the composition can be spread or trowelled and feathered onto a substrate and decrease the adhesion of the adhesive composition to the substrate. It is therefore, preferred to select the components so that the weight ratio of block copolymer to inorganic components, i.e. to the sum of aluminum powder and glass fiber, is in the range of about 3:7 to about 3:2 and is preferably in the range of about 1:2 to about 1:1; the weight ratio of block copolymer to glass fiber is at least about 2:1, and is preferably in the range of about 2:1 to 10:1; and the weight ratio of glass fiber to aluminum powder is at least about 1:9 and is preferably in the range of about 1:4 to about 1:1. The component ratios are preferably selected so that the melt viscosity of the hot melt composition is less than about 300,000 and preferably less than 150,000 cps. at a temperature of 250° C. and a shear rate of 4 sec$^{-1}$ measured in a Brookfield Thermocel Unit Model HBT. Above 300,000 centipoise melt viscosity, the hot melt is difficult to apply and spread, and tends to be dragged from the point of application.

The hot melt composition is formed by mixing the aluminum powder and the glass fiber with the melted polymer in any convenient way such as by melt blending in a blender-extruder. A good mix is considered to have been obtained if the filler particles are evenly distributed through the melt. In poor mixes, the filler particles are not adequately wet by the melt, and tend to be unevenly distributed, remaining aggregated within the melt. Melt stability of the mix is determined by maintaining the mix at 216° C. for two hours. If the melt viscosity changes less than ±10 percent during this time, the mix is considered to have melt stability.

Creep resistance of the compositions of the present invention is determined by observing the sag of a 10 to 15 gram sample of the composition placed on an aluminum plane inclined at 60° to the vertical. The observations are carried out at 175° C. and 205° C. Creep or sag in less than 60 minutes at the designated temperature is recorded as a failure to meet the test.

Impact strength is determined by applying the composition as a hot melt at 500° F. (260° C.) to a smooth steel panel 7.5 cm×22.5 cm to provide a strip 4 cm wide and in the range of 25 to 250 microns thick. The panels are conditioned for 24 hours at −30° C. One lb. (454 g) steel balls are dropped onto the strip of composition from heights of 18 inch (46 cm) and 36 inch (92 cm). The impact is repeated three times at 15 minute intervals. If chipping or cracking of the composition or separation from the steel panel occurs, the composition is considered to have failed the test.

Similar test panels are prepared for testing of the sandability of the composition. In the preparation of the panels, the ease of flow of the hot melt composition is observed and its ability to be spread or trowelled to provide a smooth cohesive strip is noted. The panel is cooled to room temperature and a disc sander, 12.5 cm diameter, with 80 grit medium tungsten carbide abrasive, is applied to the composition at 1000 rpm to smooth and feather the composition. If the surface of the composition becomes smooth enough to accept paint without "telegraphing" or showing a difference in reflectivity between the painted steel and the painted composition, and without blinding or blocking the abrasive surface of the sander, the composition is rated sandable.

Depending upon the particular substrate and especially when the substrate is bare metal, it can be advantageous to apply a primer coat to improve the adhesion of the hot melt composition. Suitable primers include the commercially available primer coatings, and the etherified methylolmelamines described in U.S. Pat. No. 4,053,682. Also suitable, can be organic solvent solutions and aqueous dispersions of the block copolymer component of the hot melt adhesive composition.

The hot melt adhesive compositions of the present invention find widespread utility in a wide variety of applications. They are especially valuable in those applications where resistance to creep at elevated temperatures is a necessary requirement. The adhesive compositions of the present invention may be used to great advantage to bond a variety of substrates including metal, glass, synthetic and natural textiles, leathers, synthetic polymeric sheet material wood, paper, etc.

The present invention also includes the concept of incorporating various ingredients into the adhesive composition to improve processing and/or performance of these materials. These additives and adjuncts include antioxidants, thermal stabilizers, extenders, dyes, pigments, adhesion promoters, plasticizers, etc.

The following examples are set forth in illustration of the invention and should not be construed as a limitation thereof. Unless otherwise indicated, all parts and percentages are by weight.

EXAMPLE 1

A block copolymer which is approximately 65 percent by weight crystalline polyethylene terephthalate segments and 35 percent by weight amorphous polyamide made from dimer acid and hexamethylene diamine, is prepared in two steps. In the first step 157.5 parts (0.272 mol) of a $C_{36}$ dibasic acid and 30.8 parts (0.266 mol) of hexamethylene diamine are charged to a reaction vessel and heated with agitation at about 215° C. for one hour to form a polyamide resin. During the first 30 minutes the pressure rises to 1000 kPa after which time the reaction vessel is vented to reduce the pressure to 600 kPa. At the end of one hour the pressure is released and 332 parts of a crystalline polyethylene terephthalate (M.P. =260° C./inherent viscosity 0.147) and 7.5 parts (0.095 mol) of ethylene glycol are charged to the vessel along with a minor amount of an antioxidant. The vessel is flushed with nitrogen and the mixture is heated to about 280° C. while maintaining a nitrogen pressure of 240 kPa. After 0.5 hour the vessel is vented and vacuum applied and the reaction is continued under full vacuum (0.1 to 5 mm. of mercury) for two hours. At the end of this time the resulting molten poly(esteramide) is discharged under pressure into a water bath to quench the material. The polymer obtained melts at 205° C. and the inherent viscosity is 0.50.

A filled composition of block copolymer, aluminum powder and glass fiber in the weight ratio of 50:37.5:12.5 is prepared by the following procedure:

To a stainless steel reactor fitted with an anchor agitator and a jacketed hot oil heating system is added 100 parts by weight of the poly(ester-amide) and heating is begun. When the contents have reached 250° C., agitation is begun at 60 rpm and 100 parts by weight of a mixture of dry aluminum powder (Alcoa Atomized Powder 123 of average particle size about 17 microns) and milled glass fiber of average length 1/16 inch (1.59 mm) is fed into the mass at a rate of 10 parts by weight per minute. The agitation is continued and the temperature raised to 266° C. under a nitrogen blanket. Agitation is continued for 15 minutes after the addition of the mixture is complete and the molten mass is discharged under slight $N_2$ pressure (250 kPa), quenched in a bath, ground and redried. This material is used as a hot melt to fill dents and orifices in a metal plate. After application it is cooled to room temperature, sanded smooth with 80 grit tungsten carbide abrasive and painted with an automotive surface coating. No "telegraphing" is observed. The filled adhesive composition is excellent in flow at 260° C., is spread or trowelled well, and passes the 18 in.lb. and 36 in.lb. impact tests at −30° C.

EXAMPLES 2–7

Filled adhesive compositions are prepared in the manner set forth in Example 1 with the same ratio of block copolymer to filler and with various ratios of aluminum powder to glass fiber. The compositions are evaluated for flow at 260° C., workability and impact strength. The data are presented in Table 1.

TABLE 1

EFFECT OF RATIO OF ALUMINUM POWDER TO GLASS FIBER IN FILLED POLYESTERAMIDE COMPOSITION

| Example | Weight ratio Al:glass | Flow at 260° C. | Workability | Impact Test, −30° C. 18 in.lb. (2.03J) | Impact Test, −30° C. 36 in.lb. (4.07J) |
|---|---|---|---|---|---|
| 1 | 3:1 | excellent | good | pass | pass |
| 2 | 1:1 | good | fair | pass | — |
| 3 | 1:2 | good | v.good | fail | — |
| 4 | 4:1 | good | good | pass | pass/fail |
| 5 | 9:1 | excellent | good | pass | fail |
| 6 | 9.5:1 | excellent | excellent | fail | fail |

TABLE 1-continued

EFFECT OF RATIO OF ALUMINUM POWDER TO GLASS FIBER IN FILLED POLYESTERAMIDE COMPOSITION

| Example | Weight ratio Al:glass | Flow at 260° C. | Work-ability | Impact Test, −30° C. | |
|---|---|---|---|---|---|
| | | | | 18 in.lb. (2.03J) | 36 in.lb. (4.07J) |
| 7 | 1:0 | excellent | good | fail | fail |

Examples 1, 2, 4 and 5 are within the scope of the invention and demonstrate the improved impact resistance at −30° C. of the hot melt adhesive and cavity filling compositions containing glass fiber in a weight ratio of glass to aluminum in the range of 1:9 to 1:1. In contrast Example 3 with a high glass fiber:aluminum ratio of 3:2, Example 6 with a low glass fiber:aluminum ratio and Example 7 without glass fiber, fail the low temperature impact test. Examples 1, 2 and 4 further show that an optimum in impact resistance at −30° C. occurs when the ratio of glass fiber to aluminum is in the range of about 1:4 to 1:1. Lap bond tensile strength (ASTM D-1002-72) of Examples 1 and 4 are 185 and 171 kg/cm$_2$.

EXAMPLE 8

A hot melt adhesive composition is prepared by mixing 150 parts by weight of dry aluminum powder (Alcoa Atomized Powder 123) and 50 parts by weight of milled glass fiber of average length 1/16 inch (1.59 mm), with 100 parts by weight of the block copolymer of Example 1 by the procedure set forth in Example 1. The composition is used as a hot melt to fill dents and orifices in a metal plate. The hot melt flows rather poorly and is trowelled smooth with some difficulty. After application, it is cooled to room temperature, sanded smooth with 80 grit tungsten carbide abrasive and painted with an automotive surface coating. No "telegraphing" of the composition through the coating is observed.

When the hot melt adhesive composition is subjected to the impact test at −30° C., it passes the 18 inch-pound (2.03 J) and 36 inch-pound (4.07 J) tests.

EXAMPLE 9

A hot melt adhesive composition is prepared as in Example 8 with a weight ratio of glass fiber to aluminum powder of 1:1. The hot melt proves to be impossible to flow or trowel except at temperatures which degrade the polymer.

EXAMPLE 10

A hot melt adhesive composition is prepared by the method set forth in Example 1 from 100 parts of the block copolymer of Example 1, 112.5 parts of aluminum powder (Alcoa Atomized Powder 123) and 37.5 parts of milled glass fiber of average length 1/32 inch (0.8 mm). The composition passed the 18 inch-pound (2.03 Joule) impact test at −30° C., but failed the 36 inch-pound (4.07 Joule) test.

EXAMPLES 11-13

Hot melt adhesive compositions similar to the composition set forth in Example 10 were prepared from milled glass fiber of average lengths 1/16 inch (1.6 mm), ⅛ inch (3.2 mm) and ¼ inch (6.4 mm). The data for impact tests carried out on the compositions at −30° C. are presented in Table 2 and show that the impact resistance is superior when the fiber length is 1/16 inch or greater.

TABLE 2

| Example | Glass Fiber Length in (mm) | Impact Tests | |
|---|---|---|---|
| | | 18 inch-pounds (2.03 Joule) | 36 inch-pounds (4.07 Joule) |
| 10 | 1/32 (0.8) | pass | fail |
| 11 | 1/16 (1.6) | pass | pass |
| 12 | ⅛ (3.2) | pass | pass |
| 13 | ¼ (6.4) | pass | pass |

EXAMPLES 14-15

A series of hot melt adhesive compositions are prepared by the procedure of Example 1 reinforced with polymeric reinforcing agents. The weight ratio of block copolymer to aluminum powder (Alcoa Atomized Powder 123) and polymeric reinforcing agent is 2:3. The compositions are subjected to the impact test at −30° C. and to the sandability test and are found to be greatly inferior to compositions such as Example 11, reinforced with glass fiber. The data are presented in Table 3.

TABLE 3

EFFECT OF POLYMERIC REINFORCING AGENTS ON IMPACT RESISTANCE

| Example | Reinforcement | Ratio of Al:Reinforcement | Impact Resistance | | Sand-Ability |
|---|---|---|---|---|---|
| | | | 18 in. lbs. (2.03 J) | 86 in. lbs. (4.07 J) | |
| 11 | glass fiber | 3:1 | pass | pass | pass |
| 14 | amorphous polypropylene | 4:1 | fail | fail | — |
| 15 | SBR rubber | 14:1 | pass | fail | fail |

EXAMPLE 16

A block copolyester of inherent viscosity about 0.6 containing 65 weight percent of polyethylene terephthalate as the hard segments interlinked by means of terephthaloyl bis-N-butyrolactam with 35 weight percent of copoly(hexamethylene isophthalate-terephthalate) (I:T, 80:20), as the soft segments, is melt blended with aluminum powder and glass fiber as described in Example 1. The blend is used as a hot melt to fill dents and orifices in a metal plate.

EXAMPLE 17

A block copoly(ether-ester) of inherent viscosity about 0.6 containing 65 weight percent of polybutylene terephthalate as the hard segments and 35 weight percent of the copolyisophthalate-terephthalate (I:T, 80:20) of polytetramethylene ether glycol (having a number average molecular weight about 600) as the soft segments, is melt blended with aluminum powder and glass fiber as described in Example 1. The blend is used as a hot melt to fill dents and orifices in a metal plate.

EXAMPLE 18

The polyamide of dimer acid and hexamethylene diamine described in Example 1 is melt reacted with a polyhexamethylene adipamide of number average molecular weight about 8000, in the weight ratio of 40:60 to provide a block copolyamide. The copolyamide is melt blended with aluminum powder and glass fiber as described in Example 1. The blend is used as a hot melt to fill dents and orifices in a metal plate.

What is claimed is:

1. A method of filling a cavity in a substrate which comprises applying excess adhesive composition as a hot melt into the cavity, spreading the adhesive composition to fill the cavity, cooling the adhesive composition below its crystallization temperature and sanding the adhesive composition to provide a surface even with the surrounding substrate, wherein the adhesive composition comprises a block copolymer, aluminum powder and glass fiber, wherein the block copolymer is selected from the group consisting of copolyesters, copolyamides, copoly(esteramides) and copoly(etheresters) melting at a temperature of above about 150° C., having from about 30 to about 70 weight percent of hard segments and from about 70 to about 30 weight percent of soft segments; wherein the weight ratio of block copolymer to aluminum powder and glass fiber is in the range of about 3:7 to about 3:2, wherein the weight ratio of block copolymer to glass fiber is at least about 2:1 and wherein the weight ratio of glass fiber to aluminum powder is at least about 1:9.

2. The method of claim 1 wherein the hard segments of the block copolymer are polyester condensates of an aliphatic or alicyclic diol having from 2 to 10 carbon atoms and an alicyclic or aromatic dicarboxylic acid having from 8 to 20 carbon atoms, or polyamide condensates of an aliphatic or alicyclic diamine having from 2 to 12 carbon atoms and an aliphatic or alicyclic dicarboxylic acid having from 2 to 12 carbon atoms, or polyamide condensates of an ω-aminocarboxylic acid having from 2 to 12 carbon atoms; and wherein the soft segments of the block copolymer are polyester condensates of an aliphatic or alicyclic diol having from 4 to 10 carbon atoms or a polylactone diol of molecular weight in the range of about 350 to 6000 and an aliphatic, alicyclic or aromatic dicarboxylic acid having from 4 to 54 carbon atoms, or poly(ether-ester) condensates of a poly(alkylene ether) glycol of molecular weight in the range of about 350 to about 6000 in which the alkylene groups have from 2 to 10 carbon atoms and an aliphatic, alicyclic or aromatic dicarboxylic acid having from 4 to 54 carbon atoms, or polyamide condensates of an aliphatic or alicyclic diamine having from 2 to 12 carbon atoms and a mixture of an aliphatic or alicyclic dicarboxylic acid having from 4 to 54 carbon atoms containing at least 40 weight percent of an aliphatic dicarboxylic acid having from 18 to 54 carbon atoms.

3. The method of claim 1 wherein the block copolymer is a copolyester wherein the hard segments are condensed from an aliphatic or alicyclic diol having from 2 to 10 carbon atoms and an alicyclic or aromatic dicarboxylic acid having from 8 to 20 carbon atoms and the soft segments are condensed from an aliphatic or alicyclic diol having from 4 to 10 carbon atoms or a polylactone diol of molecular weight in the range of about 350 to about 6000 or a poly(alkylene ether) glycol of molecular weight in the range of about 350 to about 6000 in which the alkylene groups have from 2 to 10 carbon atoms and an aliphatic, alicyclic or aromatic dicarboxylic acid having from 6 to 54 carbon atoms.

4. The method of claim 1 wherein the block copolymer is a copolyamide wherein the hard segments are condensed from an aliphatic or alicyclic diamine having from 2 to 12 carbon atoms and an aliphatic or alicyclic dicarboxylic acid having from 2 to 12 carbon atoms or from an ω-aminocarboxylic acid having from 2 to 12 carbon atoms and the soft segments are condensed from an aliphatic or alicyclic diamine having from 2 to 12 carbon atoms and a mixture of aliphatic and alicyclic dicarboxylic acids having from 4 to 54 carbon atoms containing at least 40 weight percent of an aliphatic dicarboxylic acid having from 18 to 54 carbon atoms.

5. The method of claim 1 wherein the block copolymer is a copoly(ester-amide) wherein the hard segments are condensed from an aliphatic or alicyclic diol having from 2 to 10 carbon atoms and an alicyclic or aromatic dicarboxylic acid having from 8 to 20 carbon atoms and the soft segments are condensed from an aliphatic or alicyclic diamine having from 2 to 12 carbon atoms and a mixture of aliphatic and alicyclic dicarboxylic acids having from 4 to 54 carbon atoms containing at least 40 weight percent of an aliphatic dicarboxylic acid having from 18 to 54 carbon atoms.

6. The method of claim 1 wherein the block copolymer is a copoly(ester-amide) wherein the hard segments are condensed from an aliphatic or alicyclic diamine having from 2 to 12 carbon atoms and an aliphatic or alicyclic dicarboxylic acid having from 2 to 12 carbon atoms or from an ω-aminocarboxylic acid having from 2 to 12 carbon atoms and the soft segments are condensed from an aliphatic or alicyclic diol having from 4 to 10 carbon atoms or a poly(alkylene ether) glycol of molecular weight in the range of about 350 to about 6000 in which the alkylene groups have from 2 to 10 carbon atoms and an aliphatic, alicyclic or aromatic dicarboxylic acid having from 6 to 54 carbon atoms.

7. The method of claim 5 wherein the polyester is selected from the group consisting of poly(ethylene terephthalate), co-poly(butylene terephthalate)-(ethylene-terephthalate), co-poly(ethylene terephthalate)-(ethylene isophthalate) and copoly(ethylene terephthalate)-(propylene terephthalate) and wherein the polyamide segments are condensed from a $C_{36}$ dimer acid and hexamethylene diamine.

8. The method of claim 1 wherein the adhesive composition has a melt viscosity at 250° C. of less than about 300,000 centipoise at a shear rate of 4 $sec^{-1}$.

9. The method of claim 1, 5 or 6 wherein the hard segments of the adhesive composition prior to incorporation in the block copolymer have a weight average molecular weight in the range of about 400 to about 16,000 and a melting point in the range of about 180° to about 270° C.

10. The method of claim 9 wherein the block copolymer of the adhesive composition has a weight average molecular weight in the range of about 5500 to about 30,000 and a glass transition temperature in the range of about −30° to 40° C.

11. The method of claim 10 wherein the aluminum powder of the adhesive composition has an average particle size in the range of about 0.2 to about 150 microns.

12. The method of claim 10 wherein the aluminum powder of the adhesive composition has an average particle size in the range of about 4 to about 50 microns.

13. The method of claim 11 wherein the glass fiber of the adhesive composition is milled glass fiber of average length at least about 0.8 mm.

14. A method of filling a cavity in a substrate which comprises applying excess adhesive composition as a hot melt into the cavity, spreading the adhesive composition to fill the cavity, cooling the adhesive composition below its crystallization temperature and sanding the adhesive composition to provide a surface even with the surrounding substrate, wherein the adhesive composition comprises:

(a) a poly(ester-amide) block copolymer of weight average molecular weight in the range of about 5500 to about 30,000 and of melting point in the range of about 155° C. to about 225° C., having from about 30 to about 70 percent by weight of crystalline polyester segments selected from the group consisting of poly(ethylene-terephthalate), poly-tetramethylene terephthalate), co-poly(butylene terephthlate)-(ethylene terephthalate), co-poly(ethylene-terephthalate)-(ethylene isophthalate) and co-poly(ethylene terephthalate)-(propylene terephthalate) which prior to incorporation in the poly(ester-amide), have a weight average molecular weight in the range of about 400 to about 16,000 and a melting point in the range of about 180° to about 270° C., and from about 70 to about 30 percent by weight of amorphous polyamide segments of glass transition temperature in the range of about −30° to 40° C., condensed from a $C_{18}$ to $C_{54}$ dibasic acid and an aliphatic or alicyclic diamine containing from 2 to 10 carbon atoms;

(b) aluminum powder of average particle size in the range of about 4 to about 50 microns; and (c) milled glass fiber of average length in the range of about 1.6 mm to about 6.4 mm;

wherein the weight ratio of block copolymer to aluminum powder and glass fiber is in the range of about 1:2 to about 1:1, wherein the weight ratio of block copolymer to glass fiber is in the range of about 2:1 to about 10:1, and wherein the weight ratio of glass fiber to aluminum powder is in the range of about 1:4 to about 1:1.

15. The method of claim 14 wherein the dibasic acid is a $C_{36}$ dimer acid and the diamine is hexamethylene diamine.

16. The method of claim 14 wherein the adhesive composition has a melt viscosity at 250° C. of less than about 150,000 centipoise at a shear rate of 4 $sec^{-1}$.

17. The method of claim 15 wherein the crystalline polyester segments are poly(ethylene terephthalate).

18. The method of claim 12 wherein the glass fiber of the adhesive composition is milled glass fiber of average length at least about 0.8 mm.

* * * * *